United States Patent
Farha et al.

(10) Patent No.: US 10,333,118 B2
(45) Date of Patent: Jun. 25, 2019

(54) ELECTRONICS UMBRELLA FOR ELECTRIFIED VEHICLE BATTERY PACKS

(71) Applicant: FORD GLOBAL TECHNOLOGIES, LLC, Dearborn, MI (US)

(72) Inventors: Eid Farha, Ann Arbor, MI (US); Hari Addanki, Novi, MI (US); Keith Kearney, Grosse Ile, MI (US); Chung-hsing Kuo, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 616 days.

(21) Appl. No.: 15/003,834

(22) Filed: Jan. 22, 2016

(65) Prior Publication Data

US 2017/0214016 A1    Jul. 27, 2017

(51) Int. Cl.
*H01M 2/10* (2006.01)
*H01M 2/14* (2006.01)
*H01M 10/42* (2006.01)

(52) U.S. Cl.
CPC ....... *H01M 2/1094* (2013.01); *H01M 2/1077* (2013.01); *H01M 2/14* (2013.01); *H01M 10/425* (2013.01); *H01M 10/4257* (2013.01); H01M 2220/20 (2013.01)

(58) Field of Classification Search
CPC ........... H01M 10/425; H01M 10/4257; H01M 2/1077; H01M 2/1094; H01M 2/14; H01M 2220/20
See application file for complete search history.

(56) References Cited

U.S. PATENT DOCUMENTS

| | | | |
|---|---|---|---|
| 6,445,568 B1 | 9/2002 | Baur et al. | |
| 8,894,751 B2 | 11/2014 | Galbraith et al. | |
| 2003/0082438 A1* | 5/2003 | Kwon | B60R 16/04 429/120 |
| 2010/0254087 A1* | 10/2010 | Godfroy | H05K 5/06 361/699 |
| 2010/0297486 A1* | 11/2010 | Fujii | H01M 10/625 429/120 |
| 2013/0196199 A1* | 8/2013 | Lee | H01M 2/1072 429/83 |
| 2013/0295423 A1 | 11/2013 | Engel et al. | |
| 2014/0043778 A1* | 2/2014 | Chou | H05K 1/181 361/752 |
| 2014/0370341 A1* | 12/2014 | Oshiba | H01M 2/202 429/82 |

(Continued)

FOREIGN PATENT DOCUMENTS

| | | |
|---|---|---|
| CN | 203071186 U | 7/2013 |
| JP | 10013044 A * | 1/1998 |

(Continued)

OTHER PUBLICATIONS

Machine translation of Japanese Patent Publication No. JP 10-013044. (Year: 1998).*

*Primary Examiner* — Sarah A. Slifka
*Assistant Examiner* — Lilia Nedialkova
(74) *Attorney, Agent, or Firm* — Carlson, Gaskey & Olds

(57) ABSTRACT

A battery pack according to an exemplary aspect of the present disclosure includes, among other things, an electronics module and an electronics umbrella positioned to channel moisture away from the electronics module.

12 Claims, 4 Drawing Sheets

(56) References Cited

U.S. PATENT DOCUMENTS

| | | | | |
|---|---|---|---|---|
| 2015/0072184 A1* | 3/2015 | Kusunoki | ........... | H01M 2/1223 |
| | | | | 429/54 |
| 2015/0349389 A1* | 12/2015 | Kobune | .............. | H01M 2/1077 |
| | | | | 429/90 |
| 2016/0233482 A1* | 8/2016 | Bosch | ................. | H01M 2/1077 |
| 2017/0084884 A1* | 3/2017 | Tononishi | ........... | H01M 2/0237 |

FOREIGN PATENT DOCUMENTS

| | | |
|---|---|---|
| JP | 2011049014 A | 3/2011 |
| KR | 20140002431 A | 1/2014 |

* cited by examiner

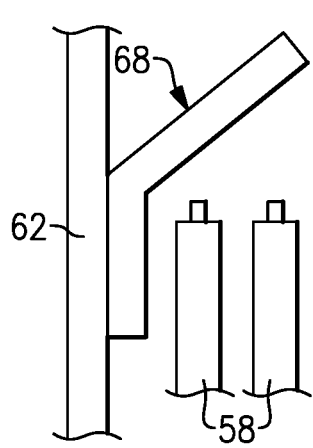
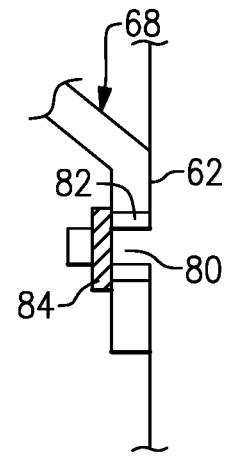
FIG.6  FIG.7
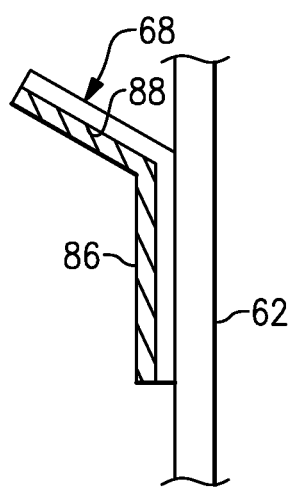
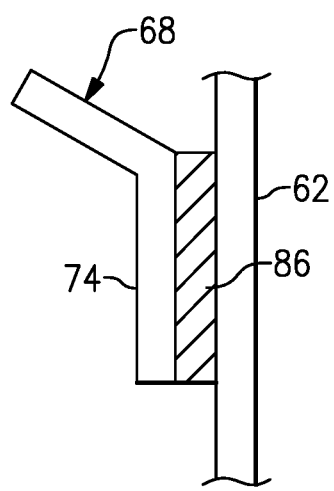
FIG.8A  FIG.8B

ELECTRONICS UMBRELLA FOR ELECTRIFIED VEHICLE BATTERY PACKS

TECHNICAL FIELD

This disclosure relates to a battery pack for an electrified vehicle. The battery pack includes an electronics umbrella configured to channel moisture away from one or more electronics modules housed inside the battery pack.

BACKGROUND

The desire to reduce automotive fuel consumption and emissions is well documented. Therefore, vehicles are being developed that reduce or completely eliminate reliance on internal combustion engines. Electrified vehicles are one type of vehicle currently being developed for this purpose. In general, electrified vehicles differ from conventional motor vehicles because they are selectively driven by one or more battery powered electric machines. Conventional motor vehicles, by contrast, rely exclusively on the internal combustion engine to propel the vehicle.

A high voltage battery pack typically powers the electric machines and other electrical loads of the electrified vehicle. The battery pack includes a plurality of interconnected battery cells that store energy for powering these electrical loads. Numerous electronics modules are also housed inside the battery pack.

Moisture can accumulate inside the battery pack. Some internal components of the battery pack may therefore benefit from protection against moisture intrusion.

SUMMARY

A battery pack according to an exemplary aspect of the present disclosure includes, among other things, an electronics module and an electronics umbrella positioned to channel moisture away from the electronics module.

In a further non-limiting embodiment of the foregoing battery pack, the electronics module is a battery electronic control module.

In a further non-limiting embodiment of either of the foregoing battery packs, the electronics umbrella includes a base and a ramp extending from the base.

In a further non-limiting embodiment of any of the foregoing battery packs, the ramp is angled at a decline relative to the base.

In a further non-limiting embodiment of any of the foregoing battery packs, an enclosure houses the electronics module, the enclosure including a tray and a cover.

In a further non-limiting embodiment of any of the foregoing battery packs, the electronics module includes a connector cavity facing toward the cover.

In a further non-limiting embodiment of any of the foregoing battery packs, the electronics umbrella at least partially covers the connector cavity of the electronics module.

In a further non-limiting embodiment of any of the foregoing battery packs, a drain hole extends through the electronics umbrella.

In a further non-limiting embodiment of any of the foregoing battery packs, insulation is attached to the electronics umbrella.

In a further non-limiting embodiment of any of the foregoing battery packs, the insulation is attached to an inner surface of the electronics umbrella.

In a further non-limiting embodiment of any of the foregoing battery packs, the insulation is sandwiched between an enclosure wall and the electronics umbrella.

In a further non-limiting embodiment of any of the foregoing battery packs, the electronics umbrella is mounted to a wall of an enclosure that houses the electronics module.

A battery pack according to another exemplary aspect of the present disclosure includes, among other things, an enclosure, a battery assembly housed inside the enclosure, an electronics module mounted adjacent to the battery assembly and an electronics umbrella mounted to a wall of the enclosure. The enclosure is comprised of a first material having a first thermal conductivity and the electronics umbrella comprised of a second material having a second thermal conductivity that is less than the first thermal conductivity.

In a further non-limiting embodiment of the foregoing battery pack, the first material is a metal and the second material is a plastic.

In a further non-limiting embodiment of either of the foregoing battery packs, a stud protrudes from the wall, and the electronics umbrella is secured to the stud with a fastening device.

In a further non-limiting embodiment of any of the foregoing battery packs, the electronics umbrella includes a ramp configured to channel moisture away from the electronics module.

In a further non-limiting embodiment of any of the foregoing battery packs, the ramp extends at an angle relative to a base of the electronics umbrella.

In a further non-limiting embodiment of any of the foregoing battery packs, the electronics umbrella at least partially hovers over the electronics module and a second electronics module.

In a further non-limiting embodiment of any of the foregoing battery packs, the electronics module is mounted to the enclosure by a mounting flange.

A method according to another exemplary aspect of the present disclosure includes, among other things, positioning an electronics umbrella to at least partially extend above an electronics module housed inside a battery pack and communicating moisture that accumulates inside the battery pack along a surface of the electronics umbrella to a location remote from the electronics module.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 6 illustrates yet another electronics umbrella.

FIG. 7 illustrates an exemplary mounting configuration of an electronics umbrella.

FIGS. 8A and 8B illustrate additional exemplary electronics umbrellas.

DETAILED DESCRIPTION

This disclosure details a battery pack of an electrified vehicle. The battery pack includes an electronics umbrella for preventing moisture, such as condensation, from infiltrating an electronics module housed inside the battery pack. In some embodiments, the electronics umbrella is arranged to channel moisture around and away from the electronics module. In other embodiments, the electronics module is comprised of a material having a thermal conductivity that is less than the thermal conductivity of the structure the electronics umbrella is mounted to. In this way, moisture accumulates on the structure before it accumulates on the electronics umbrella. These and other features are discussed in greater detail in the following paragraphs of this detailed description.

Figure 1:
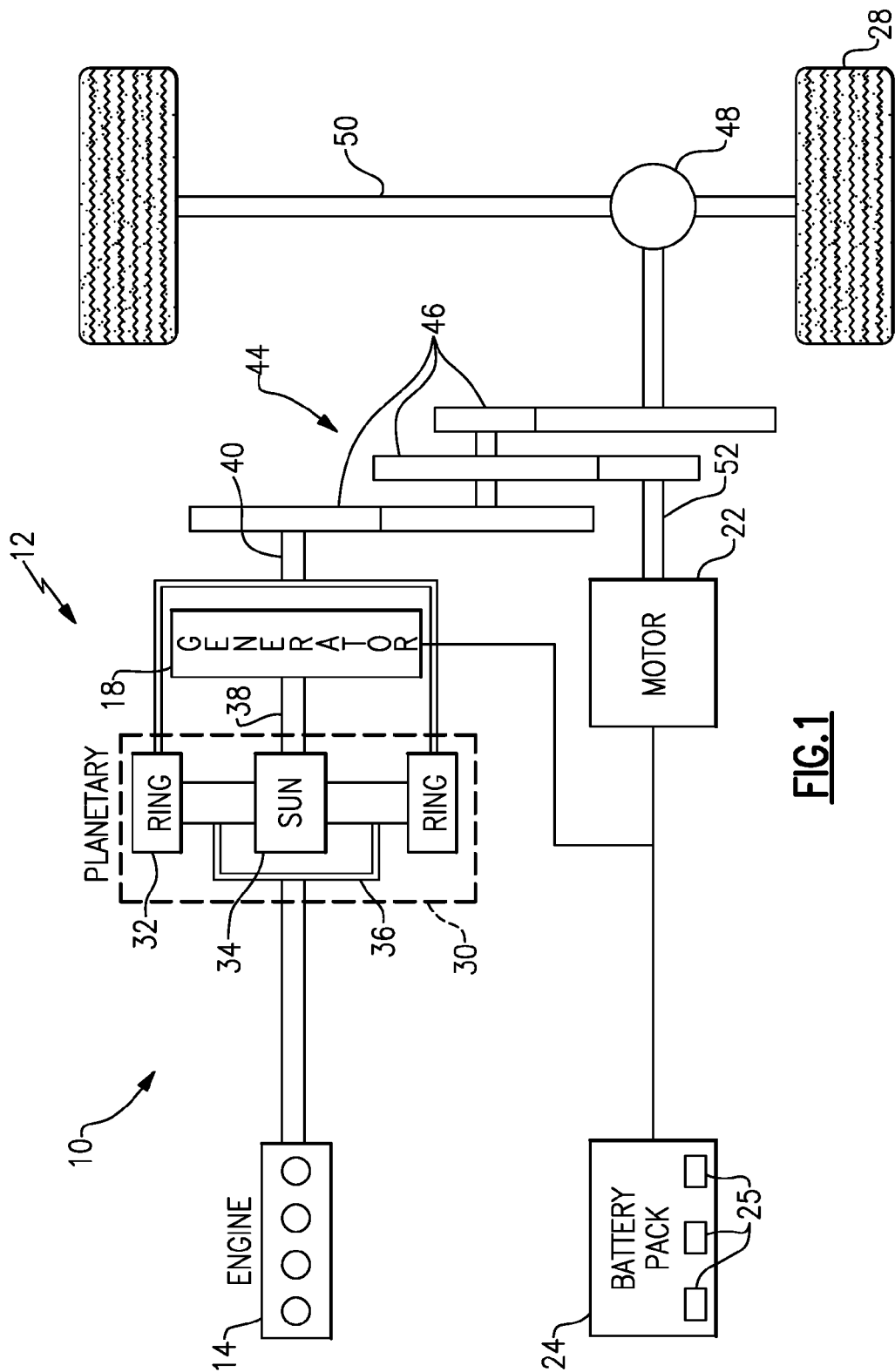
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEV's and could extend to other electrified vehicles, including, but not limited to, plug-in hybrid electric vehicles (PHEV's), battery electric vehicles (BEV's) and fuel cell vehicles.

In one non-limiting embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems generate torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids or micro hybrids.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the motor 22, the generator 18 and/or other electrical loads of the electrified vehicle 12. Other types of energy storage devices and/or output devices could also be used to electrically power the electrified vehicle 12.

In one non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

Figure 2:
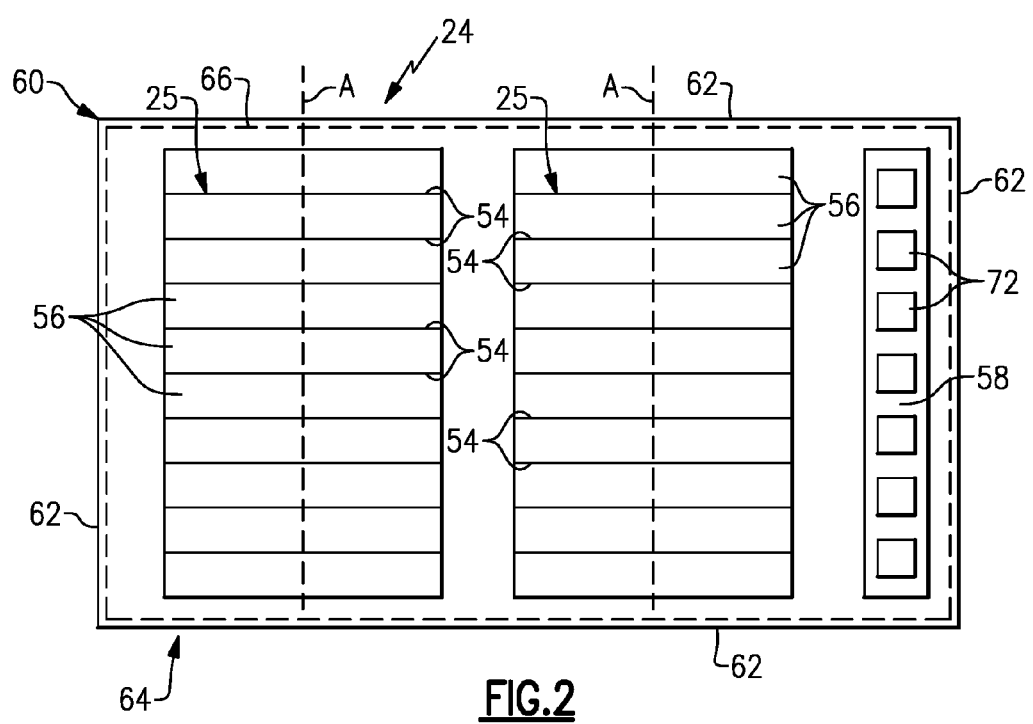
FIG. 2 illustrates a battery pack of an electrified vehicle.

FIG. 2 schematically illustrates a battery pack 24 that can be employed within an electrified vehicle. For example, the battery pack 24 could be part of the electrified vehicle 12 of FIG. 1. The battery pack 24 includes a plurality of battery cells 56 that store electrical power for powering various electrical loads of the electrified vehicle 12. Although a specific number of battery cells 56 are depicted in FIG. 2, the battery pack 24 could employ a greater or fewer number of battery cells within the scope of this disclosure. In other words, this disclosure is not limited to the specific configuration shown in FIG. 2.

The battery cells 56 are stacked side-by-side along a longitudinal axis A to construct groupings of battery cells 56, sometimes referred to as cell stacks. The battery pack 24 can include one or more separate groupings of battery cells 56.

In one non-limiting embodiment, the battery cells 56 are prismatic, lithium-ion cells. However, battery cells having other geometries (cylindrical, pouch, etc.), other chemistries (nickel-metal hydride, lead-acid, etc.), or both, could alternatively be utilized within the scope of this disclosure.

Spacers 54, which can alternatively be referred to as separators or dividers, are optionally positioned between adjacent battery cells 56 of each grouping of battery cells 56. The spacers 54 are made of thermally resistant and electrically isolating plastics and/or foams. The battery cells 56, along with the spacers 54 and any other support structures (e.g., rails, walls, plates, etc.), may be collectively referred to as a battery assembly 25. Two battery assemblies 25 are shown in FIG. 2; however, the battery pack 24 could include a greater or fewer number of battery assemblies within the scope of this disclosure.

An enclosure 60 generally surrounds each battery assembly 25 of the battery pack 24. The enclosure 60 includes a plurality of walls 62. The plurality of walls 62 together establish the enclosure 60, which houses the various hardware and electronics of the battery pack 24, including but not limited to, the battery assemblies 25 and at least one electronics module 58. In one non-limiting embodiment, the electronics module 58 is a battery electronic control module (BECM). The electronics module 58 includes one or more connector cavities 72 for connecting various electrical components within the battery pack 24.

The walls 62 of the enclosure 60 could be part of either a tray 64 or a cover 66, in another non-limiting embodiment. The cover 66 is shown in phantom in FIG. 2 to better illustrate the interior components of the battery pack 24. The cover 66 is attachable to the tray 64 to house the battery assemblies 25 and the electronics module 58.

Figure 3:
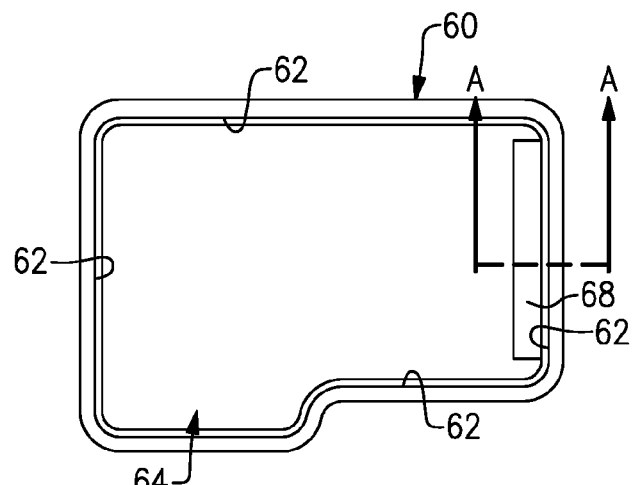
FIG. 3 illustrates portions of a battery pack.
Figure 4:
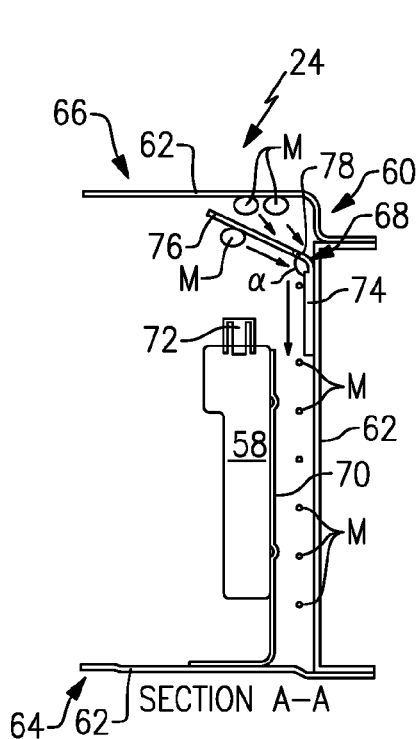
FIG. 4 is a cross-sectional view through section A-A of FIG. 3 and illustrates a right hand orientation of an electronics umbrella.

Referring now to FIGS. 3 and 4, the electronics module 58 is mounted inside the enclosure 60 via a mounting flange 70. The mounting flange 70 is secured to one of the walls 62, which in the illustrated example is a bottom wall of the tray 64. The electronics module 58 is mounted upright such that the connector cavities 72 are pointed upwardly toward the cover 66 of the enclosure 60. In this upright pointed position, the connector cavities 72 of the electronics module 58 may be susceptible to moisture intrusion. An electronics umbrella 68 is therefore positioned inside the battery pack 24. The electronics umbrella 68 is a hood-like structure arranged to cover the electronics module 58. The electronics umbrella 68 channels moisture, such as condensation, away from the electronics module 58 to substantially prevent the moisture M from entering into the connector cavities 72.

The exemplary electronics umbrella 68 includes a base 74 and a ramp 76 that extends from the base 74. The size, shape and geometry of the electronics umbrella 68, including the size, shape and geometry of each of the base 74 and ramp 76, is not intended to limit this disclosure in any way. In one non-limiting embodiment, the ramp 76 extends at an angle α relative to the base 74. The ramp 76 extends to a position in which it hovers above the electronics module 58. The ramp 76 may be declined in a direction that extends from the cover 66 toward the tray 64. In this way, the ramp 76 aids in communicating moisture around and away from the electronics module 58. For example, moisture M that accumulates inside the enclosure 60 may drop onto the ramp 76. As the moisture M accumulates, it is channeled down the ramp 76, toward the base 74, and away from the electronics module 68. The moisture M may be channeled toward the bottom of the enclosure 60, for example. The ramp 76 may include a drain hole 78 adapted to permit moisture M to pass through the ramp 76 after it has been channeled far enough away from electronics module 58. In one non-limiting embodiment, the drain hole 78 is positioned near the interface between the ramp 76 and the base 74. The drain hole 78, however, could be positioned at other locations of the electronics umbrella 68.

Figure 5:
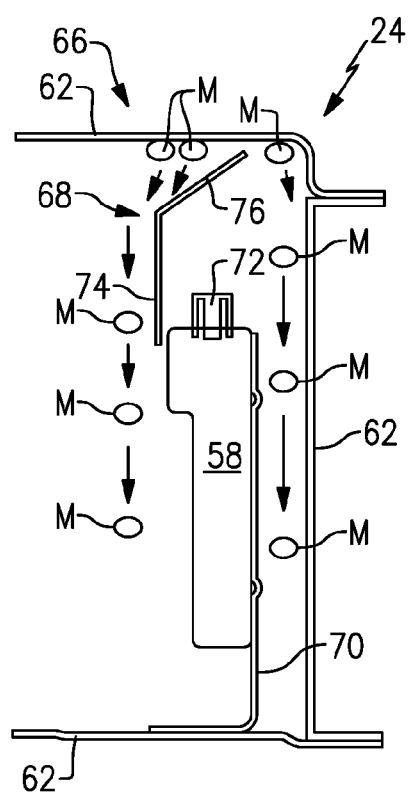
FIG. 5 illustrates a left hand orientation of an electronics umbrella.

FIGS. 3 and 4 depict a right hand orientation of the electronics umbrella 68. A left hand orientation of the electronics umbrella 68 may also be utilized to prevent moisture from entering the connector cavities 72 of the electronics module 58 (see, for example, FIG. 5). Other configurations of the electronics umbrella 68 are also contemplated as within the scope of this disclosure. In yet another non-limiting embodiment, the electronics umbrella 68 is arranged to cover a plurality of electronics modules 58 (see, for example, FIG. 6). In addition, although a single electronics umbrella 68 is depicted in the schematics accompanying this disclosure, the battery pack 24 could be equipped with multiple electronics umbrellas 68.

The electronics umbrella 68 is mounted to at least one of the walls 62 of the enclosure 60. In this embodiment, the wall 62 is a sidewall of the enclosure 60, and could be a sidewall of the tray 64. However, it should be understood that the electronics umbrella 68 could be mounted to any portion of the enclosure 60, including any wall 62 or any portion of the tray 64 or the cover 66.

In one non-limiting embodiment, the electronics umbrella 68 is a plastic structure and the walls 62 of the enclosure 60 are metallic structures. In another non-limiting embodiment, the electronics umbrella 68 is made of a material having a first thermal conductivity and the walls 62 of the enclosure 60 are made of another material having a second thermal conductivity. The first thermal conductivity may be a lower thermal conductivity than the second thermal conductivity to ensure that the moisture M (e.g., condensation) accumulates on the enclosure 60 prior to the electronics umbrella 68.

A non-limiting mounting configuration of the electronics umbrella 68 is illustrated in FIG. 7. One or more studs 80 protrude from the wall 62 of the enclosure 60. The stud 80 extends through a slot 82 formed in the base 74 of the electronics umbrella 68. The electronics umbrella 68 is secured to the wall 62 using a fastening device 84, such as a nut. In another non-limiting embodiment, the electronics umbrella 68 is glued to one of the walls 62 of the enclosure 60. Additional attachment mechanisms are also contemplated within the scope of this disclosure. Moreover, the electronics umbrella 68 could be mounted to the enclosure 60 or any other neighboring structure within the enclosure 60.

Referring to FIGS. 8A and 8B, insulation 86 can be optionally used in conjunction with the electronics umbrella 68. The insulation 86 reduces the amount of heat transfer that is effectuated between the wall 62 of the enclosure 60 and the electronics umbrella 68. In a first non-limiting embodiment, the insulation 86 is attached to an inner surface 88 of the electronics umbrella 68 (see FIG. 8A). In a second non-limiting embodiment, the insulation 86 is sandwiched between the base 74 of electronics umbrella 68 and the wall 62 the electronics umbrella 68 is mounted to (see FIG. 8B). However, the insulation 86 could be positioned at any location that has an influence on the amount of heat transfer permitted to occur between the electronics umbrella 68 and the enclosure 60.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery pack, comprising:
    an enclosure;
    an electronics module mounted inside said enclosure;
    an electronics umbrella mounted to an interior wall of said enclosure and positioned to channel moisture away from said electronics module; and
    a drain hole extending through said electronics umbrella, wherein said drain hole is located near an interface between a ramp and a base of said electronics umbrella,
    wherein said ramp extends at least partially above said electronics module and is spaced apart from a cover of said enclosure.

2. The battery pack as recited in claim 1, wherein said electronics module is a battery electronic control module.

3. The battery pack as recited in claim 1, wherein said ramp extends from said base.

4. The battery pack as recited in claim 3, wherein said ramp is angled at a decline relative to said base.

5. The battery pack as recited in claim 1, wherein said enclosure includes a tray and a cover.

6. The battery pack as recited in claim 5, wherein said electronics module includes a connector cavity facing toward said cover.

7. The battery pack as recited in claim 6, wherein said electronics umbrella at least partially covers said connector cavity of said electronics module.

8. The battery pack as recited in claim 1, comprising insulation attached to said electronics umbrella.

9. The battery pack as recited in claim 8, wherein said insulation is attached to an inner surface of said electronics umbrella.

10. A battery pack, comprising:
    an enclosure;
    an electronics module mounted inside said enclosure;
    an electronics umbrella mounted to an interior wall of said enclosure and positioned to channel moisture away from said electronics module;
    a drain hole extending through said electronics umbrella; and
    insulation attached to said electronics umbrella,
    wherein said insulation is sandwiched between said interior wall and said electronics umbrella.

11. The battery pack as recited in claim 1, wherein said electronics module is mounted to said enclosure by a mounting flange that is mounted to a second interior wall of said enclosure.

12. A battery pack, comprising:
    an enclosure;
    an electronics module mounted inside said enclosure;
    an electronics umbrella mounted to an interior wall of said enclosure and positioned to channel moisture away from said electronics module;
    a drain hole extending through said electronics umbrella; and
    a stud that protrudes from said interior wall of said enclosure, wherein said stud extends through a slot of said electronics umbrella.

* * * * *